(12) United States Patent
Winarto et al.

(10) Patent No.: US 6,695,341 B2
(45) Date of Patent: Feb. 24, 2004

(54) CONTAINMENT IMPACT PROTECTION SYSTEM

(75) Inventors: Joko P Winarto, Novi, MI (US); Jeffrey J Schultz, Swartz Creek, MI (US); Robert T Bingham, II, Grand Blanc, MI (US); Jeffrey W Ronne, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 53 days.

(21) Appl. No.: 10/046,807

(22) Filed: Jan. 15, 2002

(65) Prior Publication Data

US 2003/0132619 A1 Jul. 17, 2003

(51) Int. Cl.$^7$ ............................................... B60R 21/22
(52) U.S. Cl. .................................. 280/730.2; 280/743.2
(58) Field of Search ......................... 280/730.2, 743.2, 280/749

(56) References Cited

U.S. PATENT DOCUMENTS

| | | | | |
|---|---|---|---|---|
| 5,480,181 A | * | 1/1996 | Bark et al. ............... | 280/730.2 |
| 5,865,462 A | * | 2/1999 | Robins et al. ............ | 280/730.2 |
| 6,095,551 A | * | 8/2000 | O'Docherty .............. | 280/730.2 |
| 6,152,481 A | | 11/2000 | Webber et al. ........... | 280/730.2 |
| 6,276,712 B1 | * | 8/2001 | Welch et al. ............. | 280/730.2 |
| 6,508,487 B2 | * | 1/2003 | Koster ...................... | 280/730.2 |
| 6,517,110 B1 | * | 2/2003 | Butters et al. ............. | 280/749 |
| 2001/0033073 A1 | * | 10/2001 | Hammond et al. ...... | 280/730.2 |

FOREIGN PATENT DOCUMENTS

| | | | | |
|---|---|---|---|---|
| DE | 4307175 A1 | * | 9/1993 | ........... B60R/21/02 |
| EP | 0896909 A3 | | 7/1999 | |

* cited by examiner

Primary Examiner—Eric Culbreth
Assistant Examiner—Laura B. Rosenberg
(74) Attorney, Agent, or Firm—Laura C. Hargitt

(57) ABSTRACT

A containment impact protection system having a deployable barrier panel substantially covers the side windows of the vehicle when the system is deployed. A longitudinally disposed inflatable tube member is attached to the barrier panel at a location approximately halfway between the top and bottom of the windows. A tensioning device responsive to the inflation of the inflatable tube member produces a force deploying the barrier panel from a stored state to a deployed state. A longitudinal inflatable cushion is provided between the inflatable tube member and the bottom of the barrier panel.

16 Claims, 4 Drawing Sheets

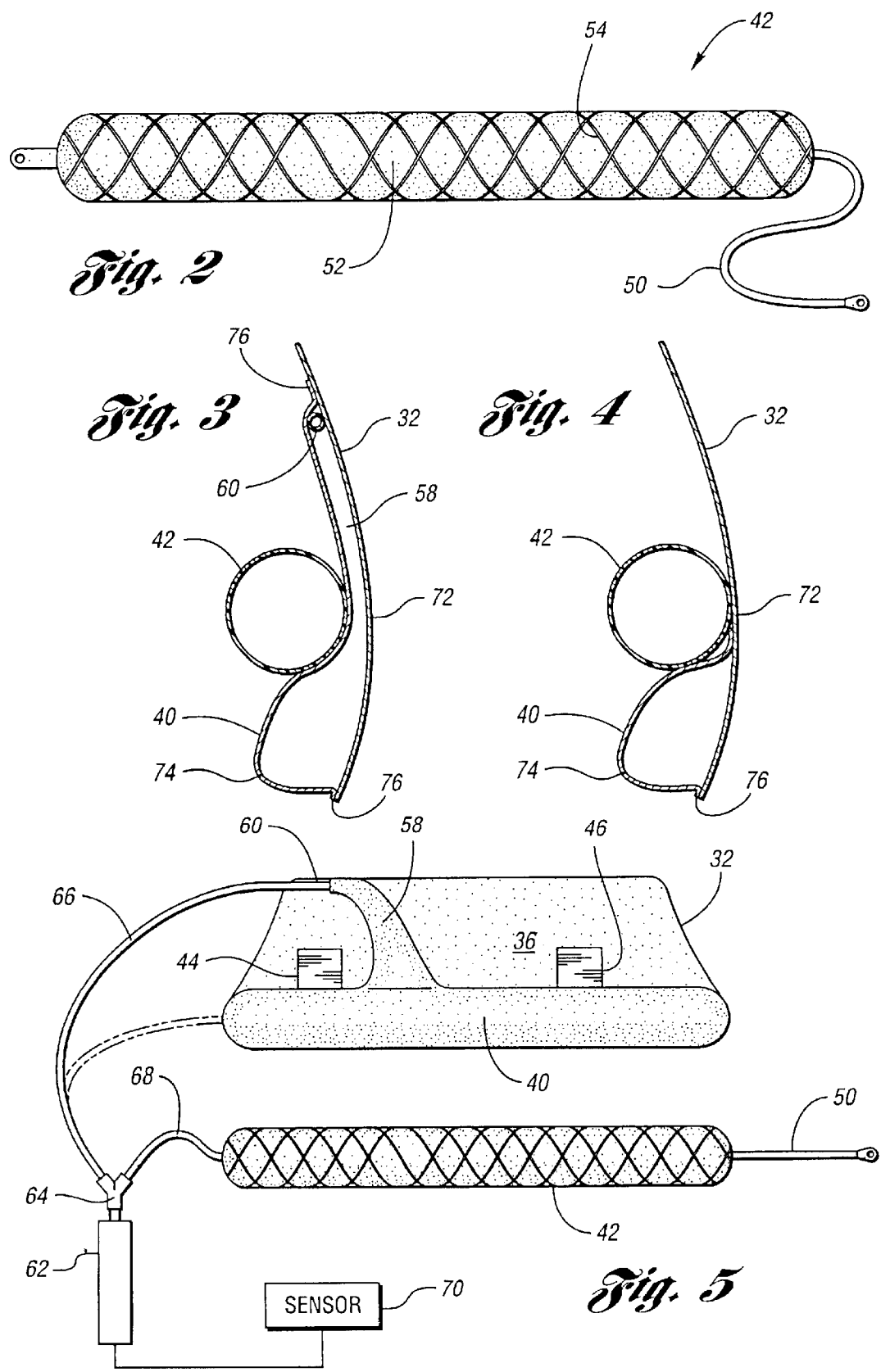

CONTAINMENT IMPACT PROTECTION SYSTEM

BACKGROUND OF THE INVENTION

1. Field of the Invention

The invention is related to the field of automotive impact protection systems and in particular to a containment impact protection system.

2. Background Art

The safety of the occupants of an automotive vehicle involved in a crash or rollover is of prime concern to the automobile industry. Safety protection systems have steadily improved over the years. Initially, seat belts were incorporated into the vehicles to secure the occupants to the seat in the event of an accident. Currently all automotive vehicles are now equipped with seat belts. Next, single shoulder belts were incorporated into the seat belt systems. Subsequently, front air bags were incorporated into the steering wheel housing and dashboard to further protect occupants in head on collisions. Currently, inflatable side air bags are being developed to protect the occupants from side impacts or subsequent events such as rollovers. Typical examples of such side air bags are taught by James Lloyd Webber, et al. in U.S. Pat. No. 6,452,481 and by Mynor Castro in published European Patent Application EP0896909A2.

It is desirable to incorporate into the vehicle an impact protection system which is designed to protect the occupants from injury resulting from impact against structural members of the vehicle and to contain the occupants within the vehicle in the event of a second event or a rollover.

SUMMARY OF THE INVENTION

A containment impact protection system is provided for use in an automotive vehicle to protect the occupants in the vehicle from side impacts and subsequent events such as rollovers. The protection system has a deployable barrier panel which substantially covers one or more of the side windows of the vehicle. An inflatable tube member is slidably attached to the barrier panel at a location approximately halfway between the top and bottom of the window. A tensioning device is attachable to structural members of the vehicle on opposite sides of the windows. The tensioning device is responsive to the rapid inflation of the inflatable tube member to produce a force which deploys the barrier panel from the stored location to the deployed state, and in cooperation with the barrier panel provides for the containment of the occupant within the vehicle as the result of an impact or rollover.

An inflatable cushion is provided longitudinally below the inflatable tube member and covers the lower portion of the window between the inflatable tube member and the bottom of the barrier panel. The inflatable cushion inhibits contact of the occupant's head with a component of the vehicle, such as the window. The location of the inflatable cushion below the inflatable tube member provides protection for small occupants. An inflator responsive to a side impact or rollover produces a gas flow rapidly inflating the inflatable tube member and the inflatable cushion.

The object of the containment impact protection system is an improved mechanism for the containment of the occupant of a vehicle in the event of a side impact or rollover event.

Another object of the improved containment impact protection system is to provide inflatable cushions at locations preventing the engagement of the occupant's head with rigid structural members of the vehicle.

Still another object of the improved impact protection system is to provide inflatable cushions at locations which are effective for protecting smaller occupants.

Another object of the invention is to provide the inflatable tube member and tensioning device about halfway between the top and bottom of the windows to provide improved containment of the occupants during a rollover.

These and other objects of the invention will become more apparent from a reading of the detailed description of the preferred embodiment in conjunction with the drawings.

BRIEF DESCRIPTION OF THE DRAWINGS

FIG. 2 is a side view of an inflatable tube structure of the impact protection system;

FIG. 3 is a cross-sectional view of the containment impact protection system taken along section line 3—3 of FIG. 1;

FIG. 4 is a cross-sectional view of the containment impact protection system taken along section line 4—4 of FIG. 1;

FIG. 5 is an exploded view showing the pneumatic connection between the inflator, the inflatable tube structure and the inflatable cushion;

DETAILED DESCRIPTION OF THE PREFERRED EMBODIMENTS

Figure 1:
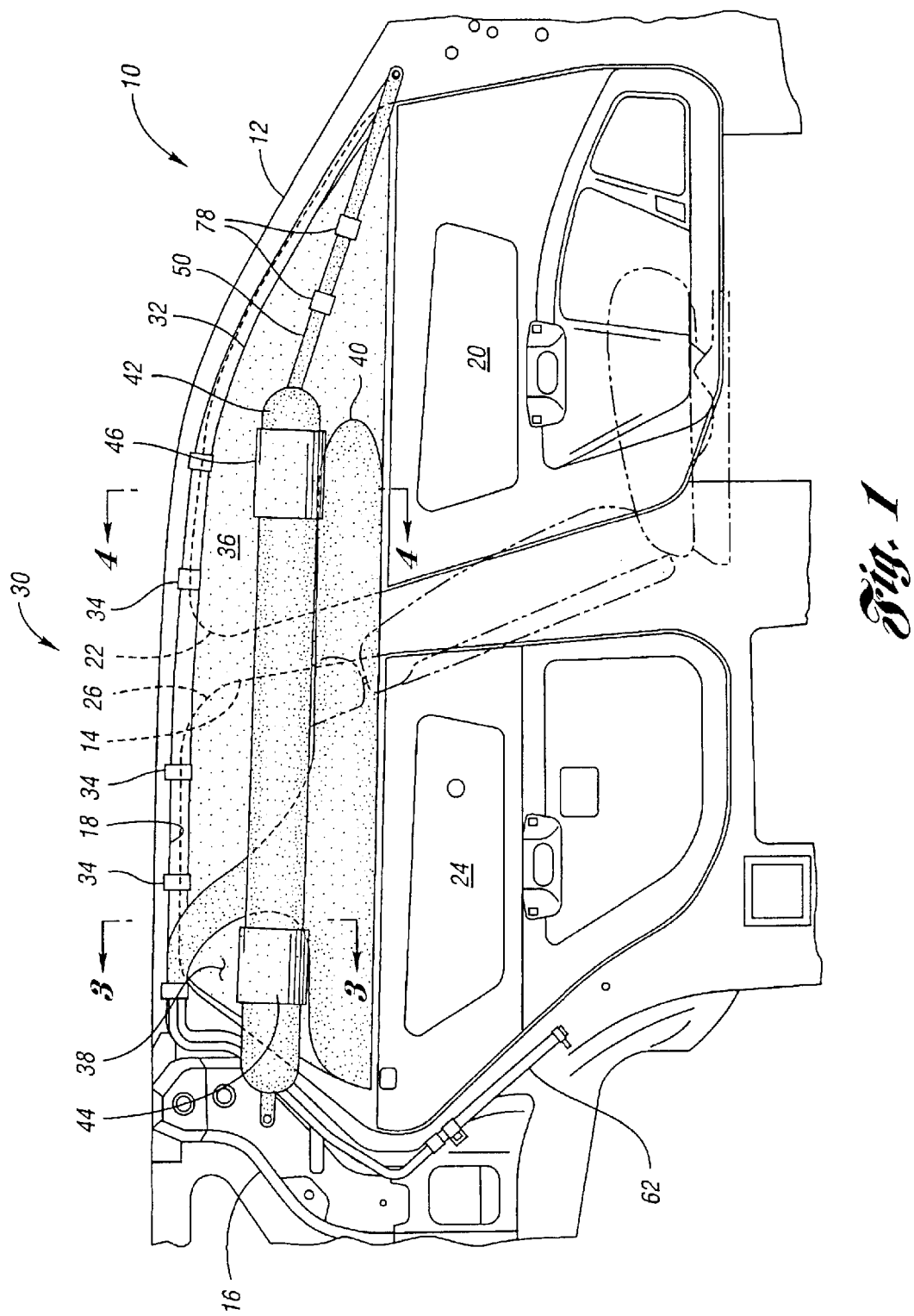
FIG. 1 is a fragmentary internal side view of an automotive vehicle with the containment impact protection system deployed.

FIG. 1 illustrates a side view of the interior of an automotive vehicle 10. In the illustrated embodiment, the vehicle 10 is a four-door sedan, but may be a two-door sedan, a suburban utility vehicle (SUV), or a truck. In the illustrated embodiment, the vehicle has an "A" or front pillar 12, a "B" or center pillar 14, and a "C" or rear pillar 16. The "A," "B" and "C" pillars, 12–16, respectively, are joined to and support a roof rail 18. A front door 20 has a window 22, and a rear door 24 has a window 26. Only the left side or driver's side of the vehicle 10 is illustrated, but it is recognized that the vehicle 10 will have a right or passenger side (not shown) which is substantially a mirror image of the illustrated left side.

The containment impact protection system 30 in FIG. 1 is shown in its deployed state. The containment impact protection system 30 has a barrier panel 32 attached along its upper edge to the roof rail 18 at two or more locations. The barrier panel 32 may have two or more eyelets 34 by means of which the upper edge of the barrier panel is bolted to the roof rail 18. The barrier panel is made from a material comparable to the material used in conventional front seat air bags. The barrier panel 32 effectively covers the windows 22 and 26 of the front and rear doors 20 and 24, respectively. The barrier panel 32 effectively confines the head and arms of an occupant to the interior of the vehicle 10 in the event the vehicle rolls over. The upper portions 36 and 38 of the barrier panel 32 are non-inflatable, while the lower portion of the barrier panel 32 embodies an inflatable cushion 40 which is formed integral with the barrier panel 32. The inflatable cushion 40 extends longitudinally along the bottom edge of the barrier panel 32 the full length of the rear door window 26 to a location forward of the "B" pillar 14.

Preferably, the inflatable cushion will extend approximately halfway across the length of the front door window 22, but may extend the full length of the rear door window 26. The limited length of the inflatable cushion 40 across the front door window 22 is to reduce the amount of gas required to be fully inflated and reduces inflation time.

Figure 6:
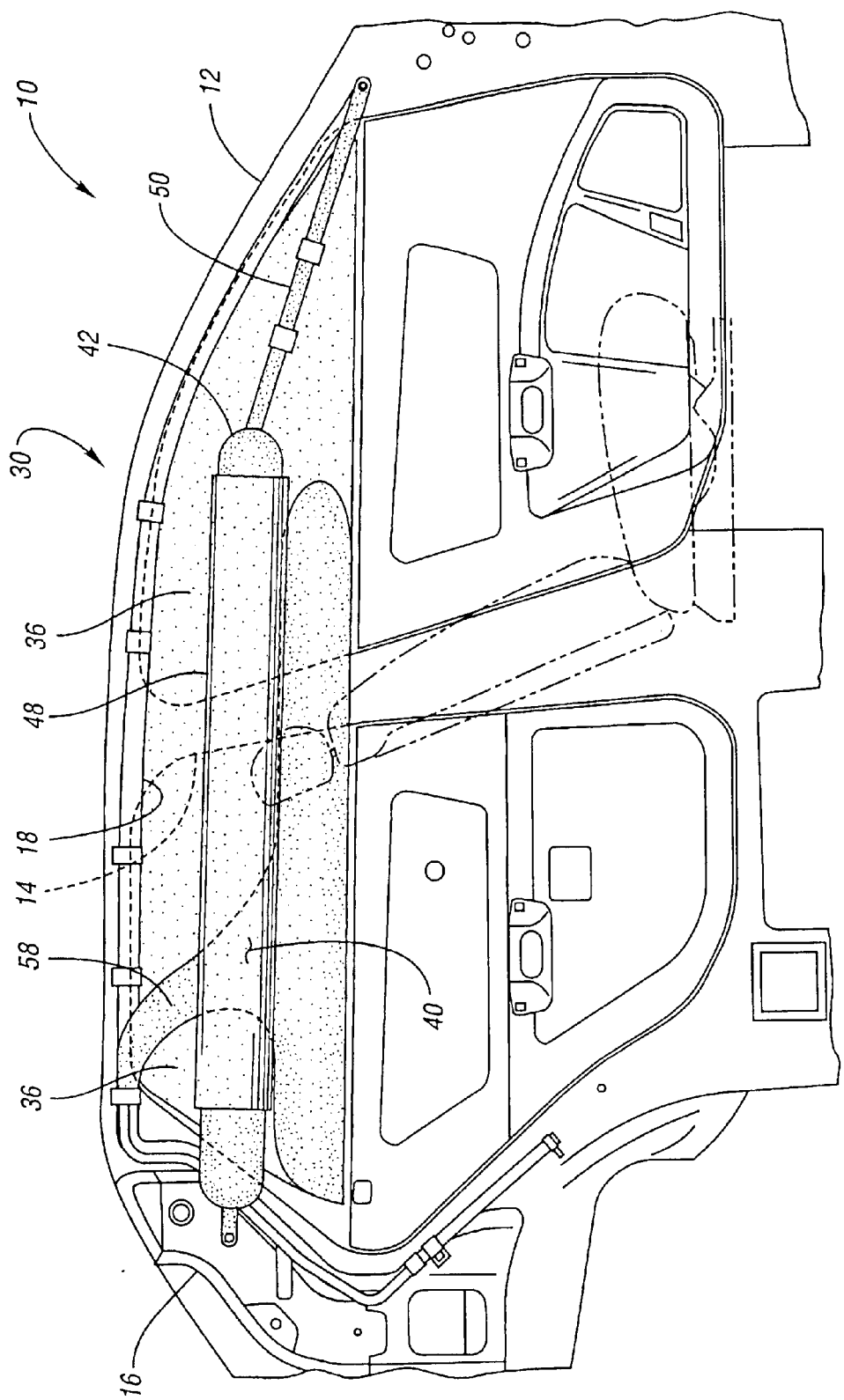
FIG. 6 is a side view similar to FIG. 1 illustrating an alternate embodiment for mounting the inflatable tube structure to the barrier panel wherein like reference numbers are used to illustrate like components from FIG. 1.

An inflatable tube structure 42 is attached to the barrier panel 32 immediately above the inflatable cushion 40. The inflatable tube structure 42 is slidably received and held in place by at least a pair of slings 44 and 46 provided on the barrier panel 32. The inflatable tube structure 42 is located approximately half-way between the top and bottom of the windows 22 and 26. Alternatively, the inflatable tube structure may be received in a longitudinal sleeve 48, as shown in FIG. 6.

One end of the inflatable tube structure is anchored to the rear or "C" pillar 16, while the forward end is attached to the front or "A" pillar 12 by means of a tether 50. Tether loops 78 may be provided on the non-inflatable portion of the barrier panel 32 to further support the non-inflated portion of the barrier panel 32.

The inflatable tube structure 42, as shown in FIG. 2, includes an inflatable tube member 52 circumscribed by a tensioning device 54. The inflatable tube member 52 is made from a coated, woven fabric material, such as typically used for air bags. The tensioning device 54 is preferably a braided structure woven about the periphery of the inflatable tube member 52. The braided structure consists of at least a pair of high-strength cord or fibers wound in clockwise and counterclockwise spirals respectively about the inflatable tube member 52. As is known in the art, when the inflatable tube member 52 is not inflated, the spirals are stretched out longitudinally and have a predetermined length. However, when the inflatable tube member 52 is inflated, the diameter of the inflatable tube member and the diameter of the braided spirals are increased. As a result, the effective length of the tensioning device 54 decreases providing a desired tension on the inflatable tube member. This tension produces a force to position the containment impact protection system such as shown in FIG. 1. It is recognized that other configurations of the tensioning device 54 are possible, such as a simple spiral or a zig-zag pattern as are taught by prior art.

The encapsulation of the inflatable tube member 52 in the braided tensioning structure 54 results in the inflatable tube structure 42 being relatively stiff when inflated. This stiffness holds the containment impact protection system 30 in place when it is deployed and helps to contain the occupants inside the vehicle.

Referring to FIGS. 1 and 5, the barrier panel 32 includes a gas feed passage 58 which connects the inflatable cushion 40 to a gas fill inlet 60 located adjacent to the roof rail 18. The gas fill inlet 60 is connected to an inflator 62 preferably attached to the "C" pillar 16. It is recognized that the structural member of the vehicle 10. As more clearly shown in FIG. 5, the gas output of the inflator 12 is connected to a "Y" coupling 64. A first tube 66 connects one branch of the "Y" coupling 64 to the gas fill inlet 60 for conducting inflator gas to the inflatable cushion 40. A second tube 68 connects the other branch of the "Y" coupling 66 to an inlet (not shown) of the inflatable tube structure 42. The inflator 62 is connected to a sensor 70 and is energized in response to a transverse acceleration exceeding a predetermined value. Alternatively, the gas feed passage 58 may be eliminated and the first tube 66 is connected to one end of the inflatable cushion 40 as indicated by the line shown in phantom in FIG. 5.

FIG. 3 is a cross-sectional view of the containment impact protection system 30 taken along section line 3—3 of FIG. 1. The barrier panel 32 has an outer panel 72 which in the deployed state lies adjacent to the "B" pillar 14 and the windows 22 and 26. The panel 72 is made from a coated, woven fabric material such as typically used in air bag construction. An inboard panel 74 is cut to the shape of the inflatable cushion 40 including the gas feed passageway 58 and attached to the outer external panel 72 in the desired locations to form the inflatable cushion 40 and the gas feed passageway 58. The seams 76 at which the inboard panel 74 is attached to the outer panel 72 are preferably sealed by some suitable combination of sewing, bonding, spraying adhesion or by radio frequency welding so that the inflating gas from the inflator 62 remains in the inflatable cushion 40 for an extended period of time. This extended period of time is necessary in the event of secondary impacts or rollover events. FIG. 4 is a cross-sectional view of the containment impact protection system 30 taken along section 4—4 of FIG. 1.

The advantage of placing the inflatable cushion 40 at the bottom of the barrier panel 32 is for the protection of the occupant's head. Crash tests indicate that this location of the inflatable cushion 40 is the region where an occupant's head would most likely strike the windows 22 or 26. This is particularly true for occupants of smaller stature, such as women and children.

Figure 7:
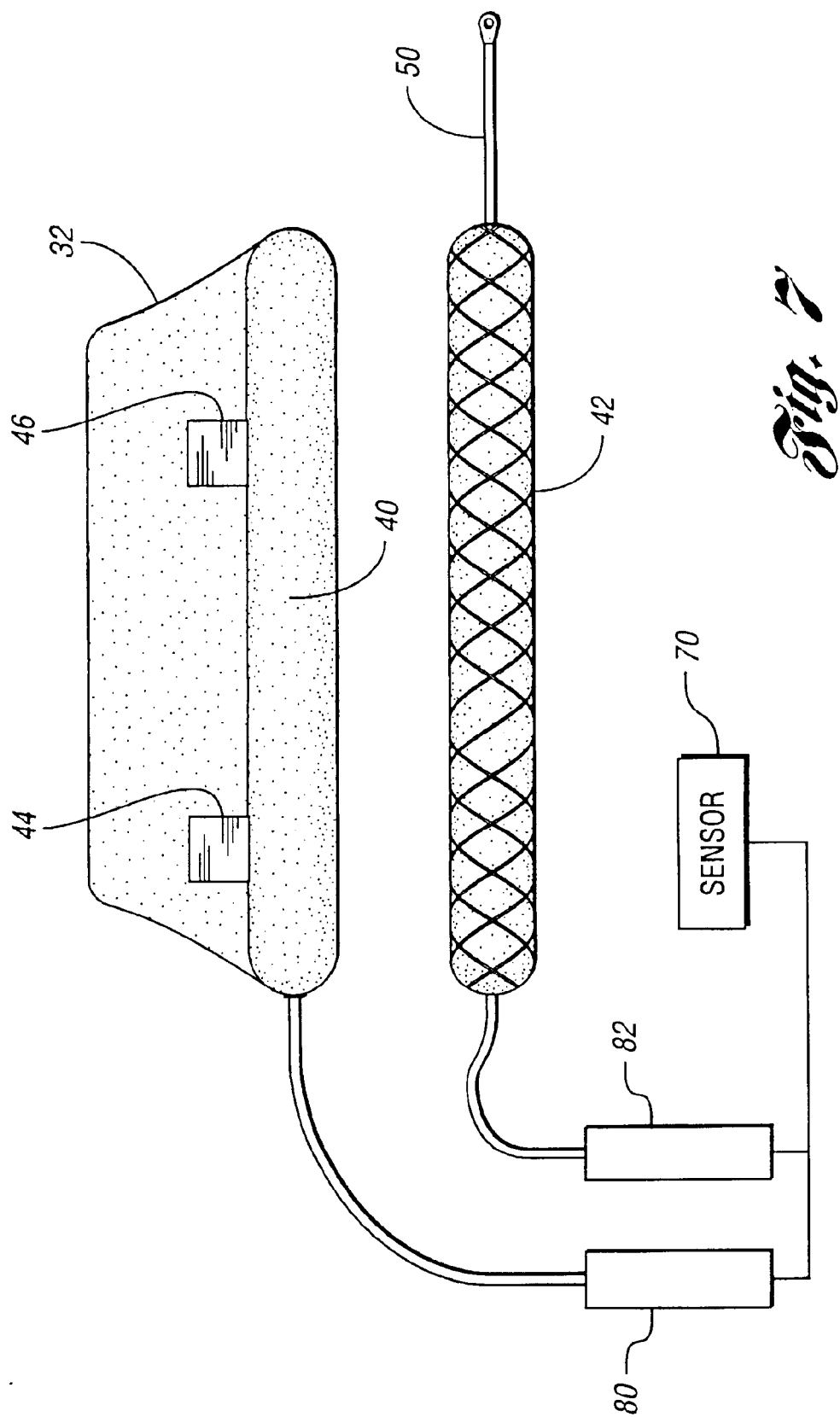
FIG. 7 is an exploded view showing the use of two inflators.

Although in the preferred embodiment only a single inflator 62 is used, it is recognized that separate inflators could be used, a first inflator 80 for inflating the inflatable cushion 40 and a second inflator 82 for inflating the inflatable tube structure 42, as shown in FIG. 7.

Further, the containment impact protection system 30 need not be limited to a four-door vehicle as discussed above. It is recognized that the system may be deployed only between the "A" pillar 12 and the "B" pillar 14 for protection of front seat occupants only, or between the "B" pillar 14 and the "C" pillar 16 for protection of rear seat occupants only.

In the undeployed state (not shown), the containment impact protection system 30 is folded and preferably stored beneath a molding above the doors. This molding would also extend to portions of the "A" pillar 12 and "C" pillar 16 such as to hide from view the tether 50 and the connection of the tensioning device 54 to the "C" pillar 18. Alternatively, the containment impact protection system may be stored in the vehicle's headliner, out of view. Upon sensing a transverse acceleration exceeding a predetermined value, the inflator 62 is activated. The inflatable cushion 40 and the inflatable tube structure 42 burst open the molding or other housing in which the containment impact protection system is stored. With the expansion of the inflatable tube member 52, the tensioning device 54 in cooperation with inflatable cushion 40 deploy the containment impact protection system to the deployed state as shown in FIG. 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A containment impact protection system for use in an automotive vehicle comprising:

a barrier panel attachable to a roof rail of the vehicle and having an inflatable portion, the barrier panel deployable from a stored state to a deployed state, wherein the barrier panel substantially covers at least one side window of the vehicle when in the deployed state;

the inflatable portion of the barrier panel including an inflatable cushion without a tensioning device provided longitudinally along a bottom portion of the barrier panel;

an inflatable tube structure having an inflatable tube member and a tensioning device connectable to structural members of the vehicle on opposite sides of the at least one side window, the tensioning device producing a longitudinal tension in response to the inflation a of the inflatable tube member operative to deploy the barrier panel;

at least one sling attached to the barrier panel, the at least one sling supporting the inflatable tube structure above the inflatable cushion substantially parallel to the bottom of the barrier panel; and an inflator for producing a gas rapidly inflating the inflatable cushion and the inflatable tube member in response to a transverse acceleration above a predetermined value.

2. The containment impact protection system of claim 1 wherein the vehicle has at least two side windows, the barrier panel in the deployed state substantially covers the at least two side windows and the tensioning device is connected to structural members of the vehicle on opposite sides of the at least two windows.

3. The containment impact protection system of claim 2 wherein the inflatable cushion is formed as an integral portion of the barrier panel.

4. The containment impact protection system of claim 2 wherein the at least one sling comprises two longitudinally spaced slings attached to the barrier panel.

5. The Containment impact protection system of claim 2 wherein the at least one sung is a sleeve attached to the barrier panel, the sleeve having a length substantially equal to the length of the inflatable tube member.

6. The containment impact protection system of claim 1 wherein the at least one inflator comprises a first inflator for inflating the inflatable cushion and a second inflator for inflating the inflatable tube structure.

7. A containment impact protection System for use in a vehicle having at least two side windows on each side of the vehicle, the protection system comprising:

a barrier panel attachable to structural members of the vehicle above the two windows and having an inflatable portion, the bailer panel having a stored state and a deployed state, in the deployed state the barrier panel substantially coven the at least two windows;

an inflatable tube member slidably attached to the barrier panel at a location approximately halfway between the top and bottom of the windows;

a tensioning device connectable to structural members of the vehicle on opposite sides of the two windows, the tensioning device responsive to the inflation of the inflatable tube member to produce a tensioning force deploying the bailer panel; and said inflatable portion of the barrier panel including an inflatable cushion without a tensioning device provided longitudinally along the bottom portion of the barrier panel, the inflatable cushion covering the two windows in the region between the inflatable tube structure to the bottom of the barrier panel.

8. The protection system of claim 7 further including means for rapidly inflating the inflatable tube member and the inflatable cushion in response to an impact to the vehicle having a force greater than a predetermined force.

9. The containment impact protection system of claim 8 wherein the inflatable portion of the barrier panel is further including a gas passageway extending from the top of the barrier panel to the inflatable cushion, the means for rapidly inflating the inflatable tube member and the inflatable cushion being connected to the gas passageway to inflate the inflatable cushion.

10. The containment impact protection system of claim 8 having a first inflator providing inflation gas to the inflatable cushion and a second inflator providing inflation gas to the inflatable tube member.

11. The containment impact protection system of claim 7 wherein the inflatable cushion is formed as an integral portion of the barrier panel.

12. The containment impact protection system of claim 7 wherein the barrier panel has a pair of spatially separate slings slidably receiving the inflatable tube member and the tensioning device.

13. The containment impact protection system of claim 7 wherein the barrier panel has a sleeve slidably receiving the inflatable tube member and the tensioning device.

14. A containment impact protection system for USC in an automotive vehicle comprising:

a barrier panel attachable to a roof rail of the vehicle and having an inflatable portion, the barrier panel deployable from a stored state to a deployed state, wherein the barrier panel substantially covers at least one side window of the vehicle when in the deployed state;

the inflatable portion of the barrier panel including an inflatable cushion without a tensioning device provided longitudinally along a bottom portion of the barrier panel;

an inflatable tube structure having an inflatable tube member and a tensioning device connectable to structural members of the vehicle, the tensioning device producing a longitudinal tension in response to the inflation of the inflatable tube member operative to deploy the barrier panel; and an inflator for producing a gas rapidly inflating the inflatable cushion and the inflatable tube member in response to a transverse acceleration above a predetermined value;

said barrier panel including an outer panel and an inboard panel, one of said outer and inboard panels being configured to the shape of said inflatable cushion and sufficiently sealingly attached to the other panel to form the inflatable cushion so that the inflating gas from said inflator remains in the inflatable cushion for an extended predetermined time.

15. The containment impact protection system of claim 14 including a gas feed passageway in communication with said inflatable cushion and wherein said one of said outer and inboard panels is configured to the shape of said gas feed passageway.

16. A containment impact protection system for use in an automotive a barrier panel attachable to a roof rail of the vehicle and having an inflatable portion, the barrier panel deployable from a stored state to a deployed state, wherein the barrier panel substantially covers at least one side window of the vehicle when in the deployed state;

the inflatable portion of the barrier portion including an inflatable cushion longitudinally along a bottom portion of the barrier panel;

an inflatable structure having an inflatable tube member and a tensioning device response to the inflation of the inflatable tube member operative to deploy the barrier connectable to structural members of the vehicle, the tensioning device producing a longitudinal panel; and an inflator for producing a gas rapidly inflating the inflatable cushion and the inflatable tube member in response to a transverse acceleration above a predetermined value;

said barrier panel including an outer panel and an inboard panel, one of said outer and inboard panels being configured to the shape of said inflatable cushion and sufficiently sealingly attached to the other panel to form the inflatable cushion so that the inflating gas from said inflator remains in the inflatable cushion for an extended predetermined time;

said containment impact protection system including a gas feed passageway in communication with said inflatable cushion and wherein said one of said outer and inboard panels is configured to the shape of said gas feed passageway.

* * * * *